Figure 1:
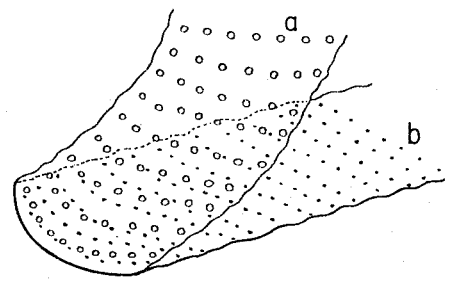

Sept. 6, 1966  HIDEO OIKAWA  3,271,194
SOLIDIFICATION OF SACCHARIDE SOLUTIONS
Filed July 24, 1964

United States Patent Office 3,271,194
Patented Sept. 6, 1966

3,271,194
SOLIDIFICATION OF SACCHARIDE SOLUTIONS
Hideo Oikawa, Yokohama-shi, Japan, assignor to Yokohama Seito Kabushiki Kaisha and Takara Kabushiki Kaisha, Tokyo-to, Japan
Filed July 24, 1964, Ser. No. 384,958
Claims priority, application Japan, Jan. 27, 1964, 39/3,565
3 Claims. (Cl. 127—60)

This invention relates to techniques for solidification of solutions of saccharides. More specifically, the invention has the general object of providing a method for solidification of solutions of saccharides whereby, by continuously, uniformly, and thoroughly mixing saccharide solutions and solid saccharides, and, at the same time, causing solidification of the same, granular sugar or powdered sugar (including soft sugar) which has a very low bulk specific gravity and is readily crushed or pulverized can be produced with high product yield.

Heretofore, the widely used method of solidifying a saccharide solution (hereinafter referred to as a sugar solution) wherein a solid saccharide is used as a seed has consisted essentially of placing the seed in the sugar solution in a concentrated state, agitating the solution for a long time until it assumes a massecuite state, then transferring the massecuite to small vessels to be left standing to cause total solidification, and then cutting or pulverizing the resulting product.

Another method resorted to in certain cases comprises introducing the sugar to become the seed into a rotating apparatus such as a rotary drier, or scattering a powdered sugar with air blast force, blowing against the sugar a concentrated solution of sugar by means of a nozzle sprayer, and granulating and drying the resulting matter by utilizing the rotation of the rotating apparatus, thereby to produce granular sugar.

However, in the case of the first method described above, there are disadvantages in that a process time of from ten or more hours to two weeks is required, even with forced cooling, to cause complete solidification so as to make possible cutting or pulverization by means of a cutting machine or a milling machine, and furthermore, the transferring and accumulation of the small vessels during this period require much labor and space, and the cutting or pulverizing, moreover, requires a large consumption of power.

In the case of the second above described method, while solidification of the sugar oslution can be carried out continuously and in a relatively short time, uniform scattering of the powdered sugar cannot be achieved in the rotary drier, for obvious reasons, even with air blast force, because of differences in the particle size and aparent specific gravity. Furthermore, in the spraying process, the blow back from the spray nozzle causes the sugar solution to drip, or the solid sugar particles to adhere to the nozzle, whereby the diameters of the liquid drops increase. As a result, coarse particles and inequable powder lumps are formed, and uneven mixing occurs. As a further result of the repeated adherence of the sugar solution and the solid sugar onto the mixture, large lumps of diameters up to 400 mm. are frequently formed, and the mechanical breaking-up of these lumps is difficult because of their tackiness, it being necessary to break up these lumps by manual labor, which generally becomes a high cost factor.

A further difficulty accompanying the above second method is that locally moist mixture due to uneven mixing adheres in great quantity to the wall surface of the rotating apparatus and, together with the aforementioned large lumps, is sent into the pulverizing means. Accordingly, the mixture yield is low, and in order to prevent this, the mixture proportion of the sugar solution to the solid sugar must unavoidably be lowered. Consequently, the mixture proportion in terms of solid component ratio with respect to the mixture is limited to from 20 to 25 percent, and the yield in one process is extremely low.

Furthermore, the granules after drying are in a spherical state wherein their surfaces are smooth and hard because of the repeated lamination. There is also the possibility of sugar solution being contained in the interior of the granules because of uneven mixing. All of these adverse results in combination cause difficulty in crushing or pulverizing the granules, and substantial power is required.

It is an object of the present invention to overcome the above described difficulties by providing a method wherein dispersion and mixing of a sugar solution and solid sugar is accomplished in a thoroughly uniform manner.

It has been found that the above stated object and other objects and advantages of the invention can be achieved by the method of the invention, which, briefly described, comprises centrifugally dispersing a sugar solution and a solid sugar in respectively separate regions, causing the two substances, as they are so dispersed, to undergo only one instance of mutual collision in an instantaneous manner at a certain region, thereby achieving thorough, uniform mixing, and treating the resulting mixture with a cold air current or a hot air current. By this method, granular sugar or powdered sugar consisting of only small particles can be produced continuously in a short time and with a stable, high yield by simple process operations and through the use of relatively simple apparatus. The product so obtained, moreover, can be readily crushed or pulverized.

Figure 2:
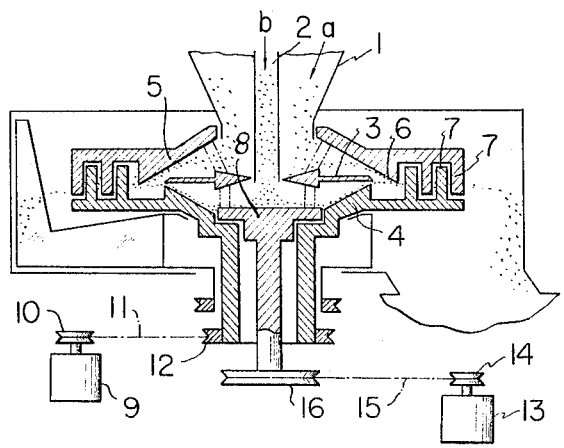

The specific nature, principle, and details of the invention will be more clearly apparent by reference to the following description with respect to a preferred embodiment of the invention and to a few illustrative examples of procedure and results, when read in conjunction with the accompanying drawing in which like parts are designated by like reference characters, and in which:

FIGURE 1 is a perspective view diagrammatically indicating the embodiment of the invention; and FIGURE 2 is an elevational schematic view, in section, indicating the principle of the invention.

The present invention is uniquely characterized in that, by dispersing both a sugar solution and a solid sugar to become the seed as completely fine particles and superimposing together these two groups of particles in a continuous and accurate manner, the particles are caused instantaneously to undergo uniform mixing and mutual adhesion, whereby a uniform thin film of the sugar solution with respect to the solid sugar is formed, during which time the liquid is simultaneously dispersed in the form of a fine spray, thereby causing evaporation of water and an abrupt drop in the liquid temperature, which, together with the heat discharge due to the thin film, causes rapid solidification of the sugar solution.

The sugar solution used according to the invention is preferably of a concentration in the range of from approximately 60 to 95 percent, and the temperature is preferably in the range of from approximately 50 to 100 degrees C. It has been found that the time required for the materials to pass through the mixing apparatus is from 1 to 2 seconds. During this period, the solidification and crystallization of the sugar solution can be promoted by measures such as supplying into the mixing apparatus a gas for solidification to provide a cold gas current or a hot gas current depending on the conditions of the nature, concentration, and temperature of the sugar solution and maintaining the mixing apparatus in a state of reduced pressure to increase the dehydration effect. If necessary, the mixture is introduced into a drier into which a cold or hot gas current is supplied to promote further the solidification, crystallization, and drying of the product.

When the mixing method of this invention is used to mix two substances $a$ and $b$ in the mixture proportions of $A_n$ and $B_m$, as indicated in FIGURE 1, the substances are respectively dispersed and spread out with uniform distributions in accordance with the proportions $A_n$ and $B_m$, to form two thin layer streams of the substances which are caused continuously to merge in a super-imposed manner.

Various kinds of mixing apparatus mechanisms for accomplishing the above described mixing may be considered, but the simplest mechanism capable of carrying out highly stable mixing is the instantaneous mixer according to Japanese Patent No. 234,116.

In this instantaneous mixer, as shown in FIGURE 2, there are provided upper and lower rotary disks 3 and 4 and a horizontal rotary disk 8, said disks being in co-axial disposition, and rotating at a high speed in horizontal planes. Concentric supply openings 1 and 2 are provided at the top of the mixer and adapted to supply substances $a$ and $b$ to the upper dish-shaped rotary disk 3 and the horizontal rotary disk 8, respectively. A rotary disk 5 of the form of an inverted dish is disposed above and coaxially with the two rotary disks 3 and 8 in a manner to form a partial ceiling above the rotary disks 3, 4 and 8. The peripheral parts of the rotary disk 5 and the lower rotary disk 4 are provided with mutually meshed, ring-shaped ridges 7 for disintegration and dispersal.

The disk 4 is rotated by an electric motor 9 through pulleys 10 and 12 and a rope stretched over said pulleys, and the disks 3, 5, and 8 are rotated by an electric motor 13 through pulleys 14, 16 and a rope stretched over said pulleys.

In the operation of the above described mixer, sugar particles $a$ to become the seed substance are introduced through the supply opening 1 onto the upper rotary disk 3 and are caused by centrifugal force to move to the lower surface of the rotary disk 5 and be spread out into a thin layer of particles in uniform arrangement which flows toward the outer rim of the disk 5.

On the other hand, a sugar solution $b$ is introduced into the mixer through the supply opening 2 onto the lower rotary disk 8 and is caused by centrifugal force to move to the upper surface of the rotary disk 4 and is spread out into a thin layer moving toward the outer rim of the disk 4, from which the solution is projected as a fine spray to the part 6 of the rotary disk 5 to collide with particles of the sugar $a$ and be mixed therewith.

This mixing action, which is accomplished as the movements of the solid and liquid particles are respectively controlled in a predetermined and accurate manner as described above. As long as the substances $a$ and $b$ are supplied continuously, their dispersion and spreading-out on the rotary disks and their mixing with particle interspersion at the part 6 are carried out continuously in accordance with the ratio of the proportions $A_n$ and $B_m$.

Furthermore, since ridges 7 for disintegration and dispersion are provided at the outer parts of the disks 4 and 5, the multistage collision with these ridges and the eddying flow of the air between the ridges add greatly to the disintegrating, dispersing, and mixing effect. This resulting effect makes possible thorough mixing even in cases wherein the seed sugar or the sugar solution is a mixture of different sugars with different particle sizes and specific gravities.

Heretofore, there has been no other instance where a mixer operating in the above described manner has been used for solidification of sugar solutions, as far as I am aware.

In order to obtain good mixing effect through the use of a mixer of the above described character, it is necessary to establish the conditions of the substance concentration, temperature, viscosity, and feed rates, and the speeds of spreading-out necessary for transforming the substances into elemental particles and for shearing. Furthermore, it is also necessary to study the variation of the degree of adhesion of the mixed substances to the ridges for disintegration and dispersion and to the casing of the mixer due to the variation in the spacing and configuration of the ridges.

As a result of research, I have found the following conditions to be suitable for reducing the invention to practice in the case of sugars in general. The concentration of the sugar solution is preferably in the range of from approximately 60 to 95 percent, and the operational temperature is preferably in the range from approximately 50 to 100 degrees C. The ridges for disintegration and dispersion preferably are diamond-shaped and spaced with a pitch of from approximately 2.5W to 3.5W (where W is the width of the ridge). Furthermore, the spread out speeds (expressed in terms of disk rotational speeds) necessary for optimum transformation into elemental particles and shearing of the substances to be treated are from approximately 600 to 1,500 r.p.m. for the disk 3.5 and 8, and from approximately 700 to 1,800 r.p.m. for the disk 4.

By the method of this invention, because the sugar solution and the solid sugar are completely and uniformly mixed, the mixture proportion of the sugar solution is greatly increased. Moreover, since independent particles are caused to undergo instantaneous contact, it is possible to prevent laminar enlargement of the particles. As a result, it is possible, by a simple operation and in a short time, to produce granular sugar or powdered sugar of low bulk specific gravity and relatively uniform particle size with stable mixture ratio and product yield.

In order to indicate still more fully the specific nature of the invention, the following examples of typical procedure and results thereof are set forth, it being understood that these examples are presented as illustrative only, and that they are not intended to limit the scope of the invention.

EXAMPLE 1

Refined dextrose of approximately 10 percent water content was fed at a feed rate of 1,180 grams/min. through the supply opening 1 of a mixer as shown in FIGURE 2. A solution of an enzyme-saccharified, refined dextrose solution of 81-percent concentration, heated to a temperature of 80 degrees C., was fed at a feed rate of 360 cc./min. through the supply opening 2. The mixer was operated with rotational speeds of 800 r.p.m. and 1,100 r.p.m., for the rotary disks 3, 5, 8 and 4, respectively. The resulting mixture, which was in a state of dry, free running particles, was further introduced into a rotary drier, into which cold air (at ambient temperature) was supplied.

The time required for the above process for any one part of the product was from 3 to 5 minutes from the feeding in of the starting materials to the exit of the product from the drier. The water content, the bulk density, and the degree of crushing of the product resulting from the above described process are shown in the accompanying Table 1, and the result of sieving is shown in Table 2.

Table 1

| Sample | Mixture Proportion (percent) | Water Content (percent) | Bulk Density (grams/100 cc.) | | Degree of Crushing (percent) | |
|---|---|---|---|---|---|---|
| | | | 5 x 10 mesh | 10 x 20 mesh | 5 x 10 mesh | 10 x 20 mesh |
| Example 1: | | | | | | |
| Sample 1 | 28 | 9.65 | 42.7 | 43.6 | 62 | 60 |
| Sample 2 | 28 | 9.67 | 42.5 | 43.8 | | |
| By spray-nozzle and rotary drier method | 28 | 6.08 | 75.7 | 76.7 | 2 | 4 |

Mixture proportion: relative to solid component.
Degree of crushing: 50 grams of specimen milled for 30 min. in ball mill at 150 r.p.m. with 20 balls (85 grams), each approx. 15 mm. in diameter.
Example:
Sample: 5 x 10 mesh, 50 grams.
After milling: 5 x 10 mesh, 19 grams.

$$\text{Deg. crushing:} \left(\frac{50-19}{50}\right) \times 100 = 62\%$$

Table 2

| Mesh | x5 | 5 x 10 | 10 x 20 | 20 x 40 | 4 x 80 | 80x |
|---|---|---|---|---|---|---|
| Sample 1, weight percent | 7.7 | 10.4 | 24.7 | 22.3 | 32.2 | 26 |

EXAMPLE 2

The procedure described in Example 1 was carried out as set forth except for a feed rate of the sugar solution of 1,000 cc./min. and introduction of cold air (at ambient temperature) into the mixer through the supply opening 1.

The water content, bulk density, and degree of crushing are shown in Table 3.

Table 3

| Sample | Mixture Proportion (percent) | Water Content (percent) | Bulk Density (grams/100 cc.) | | Degree of Crushing (percent) | |
|---|---|---|---|---|---|---|
| | | | 5 x 10 mesh | 10 x 20 mesh | 5 x 10 mesh | 10 x 20 mesh |
| Example 2: | | | | | | |
| Sample | 49 | 9.69 | 53.8 | 56.6 | 28 | 20 |
| By spray-nozzle and rotary drier method | 28 | 6.08 | 75.7 | 76.7 | 2 | 4 |

EXAMPLE 3

Refined, high-grade, soft white sugar (saccharinity approximately 97, reducing sugar approximately 1.6 percent, ash content approximately 0.1 percent) with a water content of approximately 1.2 percent was fed into the mixer of Example 1 through the supply opening 1 at a feed rate of 1,075 grams/min. A solution of an enzyme-saccharified, refined dextrose solution of 81-percent concentration, heated to a temperature of 80 degrees C. was fed at a feed rate of 360 cc./min. through the supply opening 2. Thereafter, the resulting mixture was treated under the same conditions as those set forth in Example 1.

The resulting product was a mixture sugar containing approximately 70 percent of sucrose and approximately 30 percent (solid component proportion) of dextrose and having a water content of approximately 6 percent and fine particles of dry, free running texture.

It is a highly unique feature of the present invention that, even with a high mixture proportion of sugar solution of approximately 50 percent as described above, the entire amount of the resulting product in all cases can be introduced directly, as obtained, into a crushing or milling machine, and sugar of any required particle size can be readily obtained. If a still higher mixture proportion is desired, it is possible to raise the mixture proportion by appropriately converting the mixer itself.

In the case when it is necessary to lower the degree of crushing in accordance with the product demand, it is possible also to render the product into hard particles of spherical form by supplying currents of hot air into the mixer and into the drier to soften the film on the surface of the mixed particles and causing the particles to assume spherical form by collision between the particles and their collision against the apparatus wall surfaces.

A part of the product is re-used as the seed sugar.

It should be understood, of course, that the foregoing disclosure relates to only a preferred embodiment of the invention and a few examples of typical procedure and that it is intended to cover all changes and modifications of the examples of the invention herein chosen for the purposes of the disclosure, which do not constitute departures from the spirit and scope of the invention as set forth in the appended claims.

I claim:

1. A method for the continuous solidification of sugar solutions which comprises the steps of: introducing solid phase sugar as seed onto a surface of revolution rotating at a high speed rendering said solid phase sugar into a continuous and uniform thin layer on said surface under the action of centrifugal force; introducing a liquid phase sugar onto another surface of revolution also rotating at high speed to render said solution into a continuous thin film, projecting said thin film from the edge of said another rotating surface onto said thin layer of solid phase sugar, mixing said solid and liquid phase sugars; and, simultaneously subjecting said mixed solid and liquid phase sugars to a gas flow to impart solidification thereto.

2. The process of claim 1 wherein said thin film is projected in an atomized state.

3. The process of claim 1 wherein the product obtained by said process is used for at least part of said solid phase sugar serving as seed.

References Cited by the Examiner

UNITED STATES PATENTS 2,970,057  1/1961  Terrett et al. ——————— 99—203

FOREIGN PATENTS 461,772  2/1937  Great Britain.

MORRIS O. WOLK, *Primary Examiner.*

MICHAEL E. ROGERS, *Examiner.*